UNITED STATES PATENT OFFICE.

RALPH B. NAYLOR, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

VULCANIZING RUBBER.

1,418,825.  Specification of Letters Patent.  Patented June 6, 1922.

No Drawing.  Application filed October 21, 1920.  Serial No. 418,560.

*To all whom it may concern:*

Be it known that I, RALPH B. NAYLOR, a citizen of the United States of America, residing at Springfield, in the county of Hampden and State of Massachusetts, have invented certain new and useful Improvements in Vulcanizing Rubber, of which the following is a specification.

My invention relates to a new and improved accelerator for the vulcanization of rubber. It also relates to the preparation of sponge rubber.

I have found that by incorporating phenylhydrazine in the rubber mix vulcanization is accelerated, and at the same time numerous small and even bubbles giving a spongy character to the product will be formed. The vulcanization can be performed in any of the usual ways, as by inclosing the rubber in a suitable heated mold.

As an example of the way in which my invention may be practiced I have given the following formula which produces excellent sponge rubber:

| | | |
|---|---|---|
| Rubber | 89 | parts by weight |
| Sulphur | 5 | " " " |
| Black substitute | 5 | " " " |
| Phenylhydrazine | 2 | " " " |
| | | " " " |
| Total | 101 | " " " |

"Black substitute" is the trade name given to a compound formed by boiling a raw or oxidized oil such as corn oil with sulphur.

The compound thus prepared may be vulcanized by heating in suitable mold cavities for 45 minutes at a temperature corresponding to 50 pounds of steam.

Having thus described my invention, I claim:

1. Vulcanized rubber containing the reaction product of uncured rubber, sulphur, and phenylhydrazine.

2. Vulcanized rubber containing the reaction product of substantially the following proportions of ingredients: rubber, 89 parts by weight; sulphur, 5 parts; black substitute, 5 parts; and phenylhydrazine, 2 parts.

3. The process of vulcanizing rubber comprising incorporating phenylhydrazine and sulphur with uncured rubber and subjecting the mixture to heat.

4. An accelerator for the vulcanization of rubber comprising phenylhydrazine.

5. The process of making sponge rubber comprising incorporating phenylhydrazine in the rubber mix prior to vulcanization, and subjecting the mixture to heat.

RALPH B. NAYLOR.